US011386090B2

(12) United States Patent
Seth et al.

(10) Patent No.: US 11,386,090 B2
(45) Date of Patent: Jul. 12, 2022

(54) DEFINING ATTRIBUTE FEATURE VECTORS FOR MATCHING DATA ENTITIES

(71) Applicant: International Business Machines Corporation, Armonk, NY (US)

(72) Inventors: Abhishek Seth, Deoband (IN); Soma Shekar Naganna, Bangalore (IN); James Albert O'Neill, Jr., Austin, TX (US); Lars Bremer, Boeblingen (DE); Mariya Chkalova, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 16/842,813

(22) Filed: Apr. 8, 2020

(65) Prior Publication Data
US 2021/0319026 A1 Oct. 14, 2021

(51) Int. Cl.
*G06F 7/00* (2006.01)
*G06F 16/2455* (2019.01)
*G06N 20/00* (2019.01)
*G06N 5/04* (2006.01)

(52) U.S. Cl.
CPC ......... *G06F 16/24558* (2019.01); *G06N 5/04* (2013.01); *G06N 20/00* (2019.01)

(58) Field of Classification Search
CPC ..... G06F 16/24558; G06N 20/00; G06N 5/04

USPC .................................................. 707/600–899
See application file for complete search history.

(56) References Cited

U.S. PATENT DOCUMENTS

| 2010/0030780 | A1* | 2/2010 | Eshghi ............... G06F 16/3347 707/758 |
| 2019/0102574 | A1 | 4/2019 | Roberts |
| 2019/0294594 | A1 | 9/2019 | Weghorst |
| 2019/0303371 | A1 | 10/2019 | Rowe |
| 2019/0303619 | A1 | 10/2019 | Gkoulalas-Divanis |

OTHER PUBLICATIONS

Dvorak, John N., "Biographic Entity Resolution", Challenges of managing and sharing, FBI, Global Identity Summit, Sep. 16, 2014, 20 pages.
Mell et al., "The NIST Definition of Cloud Computing", Recommendations of the National Institute of Standards and Technology, Special Publication 800-145, Sep. 2011, 7 pages.

* cited by examiner

*Primary Examiner* — Isaac M Woo
(74) *Attorney, Agent, or Firm* — David K. Mattheis; Maeve Carpenter (57) ABSTRACT

Matching records in an entity resolution system by defining entity attribute feature vectors, determining an entity attribute matching score according to a distance between two entity attribute feature vectors, assigning a statistical weight to an entity attribute matching score, adjusting the entity attribute matching score according to the statistical weight and an entity attribute frequency of occurrence, and determining an aggregate entity attribute matching score.

20 Claims, 6 Drawing Sheets

DEFINING ATTRIBUTE FEATURE VECTORS FOR MATCHING DATA ENTITIES

BACKGROUND

The disclosure relates generally to entity matching in data management. The disclosure relates particularly to defining feature vectors for candidate entity attributes for use in enterprise data matching.

Master Data Management (MDM) based solutions work with enterprise data, and perform indexing, matching and linking of data from different sources (e.g. CRM, EXPERIAN, SALESFORCE, WEB PORTAL), creating a 360 degree view of customer data. (Note: the terms "CRM", "EXPERIAN", "SALESFORCE", and "WEB PORTAL" may be subject to trademark rights in various jurisdictions throughout the world and are used here only in reference to the products or services properly denominated by the marks to the extent that such trademark rights may exist.)

Matching record pair data requires comparing different record attribute values (e.g. Name, Address, DOB, Identifier) from each pair of records to determine if they match and should subsequently be linked, based on a series of mathematically derived statistical probabilities and complex weight tables.

Attribute comparison functions check for a variety of matching conditions like exact, edit distance, N-GRAM, phonetic, or partial matching. Scores are generated based on the outcome of these comparisons, and sub scores from each attribute are combined based on statistically determined relative weights.

Using statistically defined thresholds within the system, pairs of records are considered as matched, unmatched, or indeterminant and sent to Clerical Review.

SUMMARY

Aspects of the invention disclose methods, systems and computer readable media associated with matching records in an entity resolution system by defining entity attribute feature vectors, determining an entity attribute matching score according to a distance between two entity attribute feature vectors, assigning a statistical weight to an entity feature matching score, adjusting the entity attribute matching score according to the statistical weight and frequency of occurrence of compared entity attributes relative to the overall data set, and determining an aggregate entity attribute matching score.

Aspects of the invention disclose methods, systems and computer readable media associated with matching records in an entity resolution system by defining entity attribute feature vectors, determining an entity attribute matching probability, determining a distance between two entity attribute feature vectors according to the attribute matching probability, determining an entity attribute matching score according to the distance between two entity attribute feature vectors, assigning a statistical weight to an entity attribute matching score, adjusting the entity attribute matching score according to the statistical weight and an entity attribute frequency of occurrence, and determining an aggregate entity attribute matching score.

Aspects of the invention disclose methods, systems and computer readable media associated with matching records in an entity resolution system by defining entity attribute feature vectors, determining an entity attribute matching probability, creating a distance mapping function according to clusters of entity attribute matching probabilities, determining a distance between two entity attribute feature vectors according to the attribute matching probability, determining an entity attribute matching score according to the distance between two entity attribute feature vectors, assigning a statistical weight to an entity attribute matching score, adjusting the entity attribute matching score according to the statistical weight and an entity attribute frequency of occurrence, and determining an aggregate entity attribute matching score.

DETAILED DESCRIPTION

Master data management (MDM) systems match and link records from different sources to a single entity. Probabilistic matching techniques include hundreds of algorithm parameters requiring extensive expertise for proper configuration. Weightings vary for each customer dataset and must be uniquely tailored for each dataset to be effective. Achieving customer linking pattern preferences requires manual iterative tuning activities involving expert tuning processes to yield the desired linking patterns. Multi-dimensional comparison functions (e.g. agreement on address and phone or detecting false positives like father and son at the same address by looking at disagreement over attributes name, gender, birthdate, age, identifier) is extremely complex. Data record indices can be defined at the inception of the system using the expertise of the developer. Static indices derived according to the developer's expertise can be inefficient and are not subject to change as the system processes records. Inefficiencies inherent in the original attribute indices or arising from data record evolution can hamper overall system performance. Disclosed embodiments provide methods for matching entities in enterprise data using machine learning (ML) models matching entities according to entity attribute feature vectors as well as attribute frequency of occurrence. Records evaluated by the disclosed entity matching systems and methods may include personally identifiable information (PII) provided or associated with individuals who have opted-in to the use of their information by the entity matching systems and methods.

Figure 1:
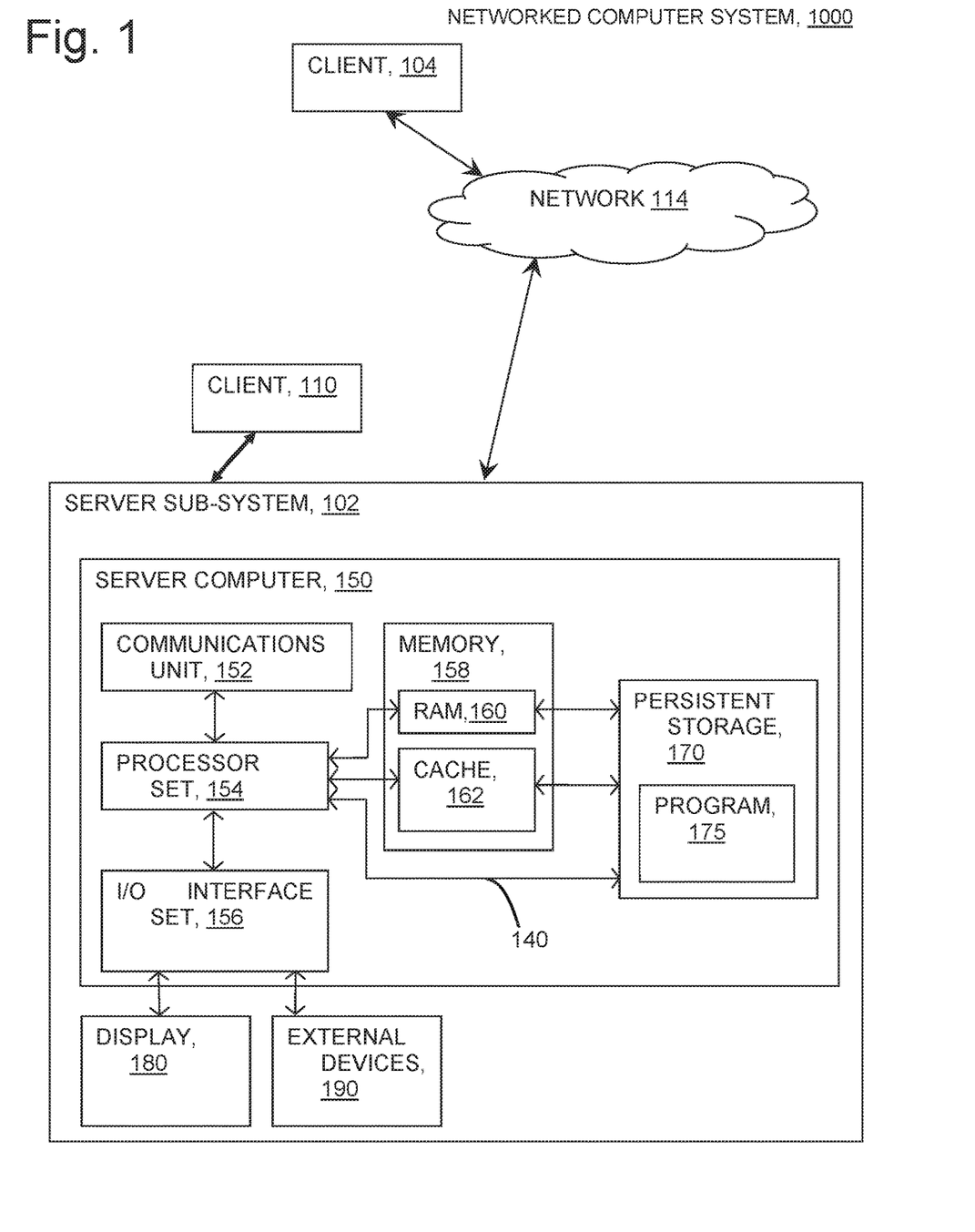
FIG. 1 provides a schematic illustration of a system, according to at least one embodiment of the invention.

FIG. 1 provides a schematic illustration of exemplary network resources associated with practicing the disclosed inventions. The inventions may be practiced in the processors of any of the disclosed elements which process an instruction stream. As shown in FIG. 1, a networked Client device 110 connects wirelessly to server sub-system 102. Client device 104 connects wirelessly to server sub-system 102 via network 114. Client devices 104 and 110 comprise master data management client programs (not shown) together with sufficient computing resources (processor, memory, network communications hardware) to execute the programs. As shown in FIG. 1, server sub-system 102 comprises a server computer 150. FIG. 1 depicts a block diagram of components of server computer 150 within a networked computer system 1000, in accordance with at least one embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the master data management program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., master data management program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
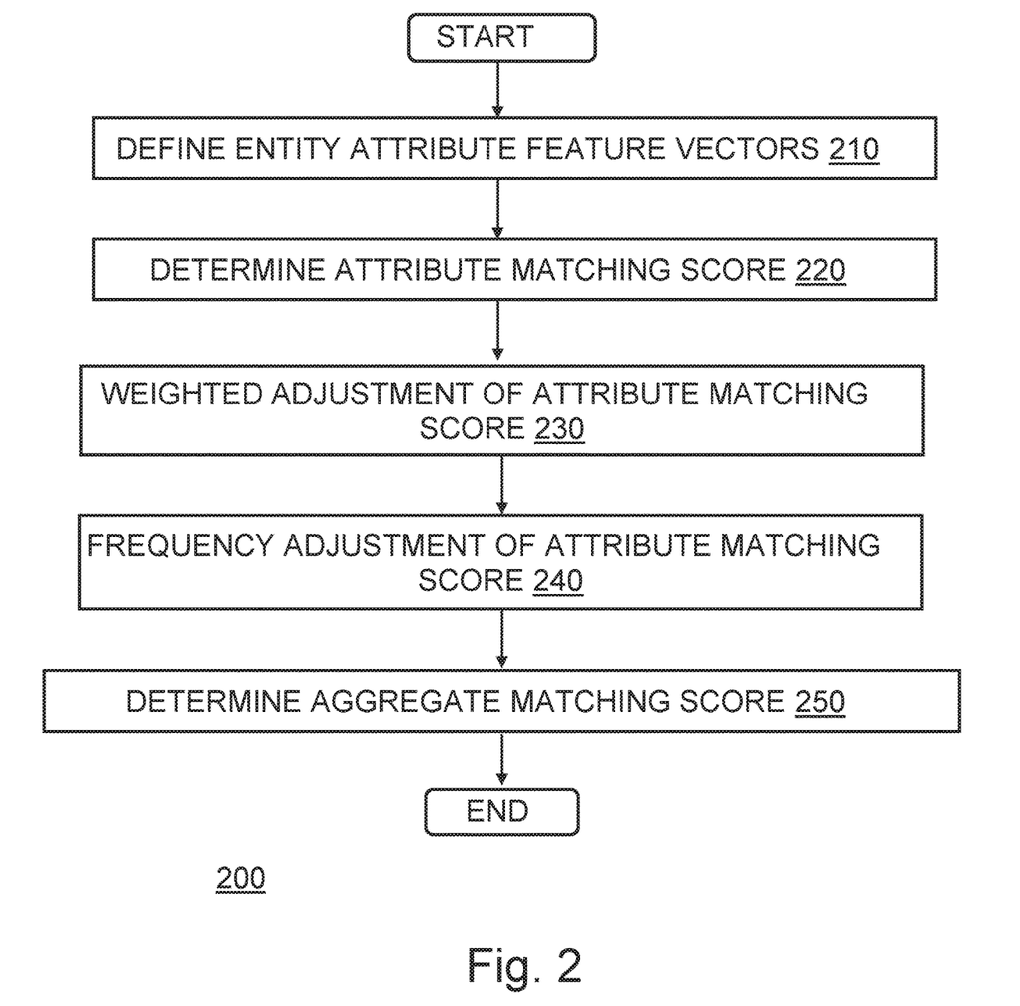
FIG. 2 provides a flowchart depicting an operational sequence, according to at least one embodiment of the invention.

FIG. 2 provides a flowchart 200, illustrating exemplary activities associated with the practice of the disclosure, including operations performed by a method of master data program 175. The method of master data program 175 relates to a system including a plurality of data records associated with identified entities. The records for each entity are considered a golden data record for the entity which includes all the cleaned, standardized and reconciled data associated with the entity. The data records include attributes used to associate the incoming records with the entity. The method of master data program 175 defines feature vectors for the attributes of the records according to one or more comparison details at 210. The comparison details include aspects of the attributes subject to comparison, where the comparison is between pairs of attribute values and determines a matched/unmatched status for the pair of values. The attribute feature vector includes a dimension associated with each defined comparison detail of the attribute. The method of master data program 175 defines feature vector values for each pair of attributes values being compared. At 220, the master data management program determines an attribute matching score for each attribute of a pair of records being compared. In determining the attribute matching score, the method passes the feature vectors to a trained machine learning model which returns a distance score based upon the probability that the feature vectors indicate a match between the pair of compared attribute values.

In an embodiment, the machine learning model includes a random forest, logistics regression or similar structure trained using generated data pairs including labeled data with matched, partially matched and unmatched attribute data pairs. The machine learning model also includes a mapping function to map the probability of matching to a distance score. In an embodiment, the mapping function simply maps the probability linearly to a distance—0%-0, 0.0%-10%-1, >105-20%-2, and so on. In an embodiment, a mapping function is created based upon the probability distribution of the training data set. The distribution is evaluated for clusters of data points and distance scores are assigned to the respective data clusters. In use, the model than maps new data probability results to the distance score associated with the cluster location to which the new data probability maps.

In an embodiment, at block 230, master data program 175 adjusts the attribute matching distance scores using statistically derived weights. The statistically derived weights are determined according to the significance of each attribute to determining a match among the complete set of attributes across, initially the training set, and as the method is used across the training data set and all new data pair comparisons. In an embodiment, individual attribute weights are associated with the probability of a ML distance score of zero (score (0)) for the attribute when comparing an unmatched pair of values. Higher weightings are assigned to attributes more strongly associated with correctly matched record pairs.

At block 240, MDM program 175 further adjusts the attribute matching distance scores according to the frequency of occurrence of the respective attribute. The frequency and attribute weights are initially determined according to the evaluation of the training data set and are continuously adjusted as new record pairs are compared and matched.

At block 250, MDM program 175 determines an aggregate matching score according to the combination of the individual attribute matching scores. In an embodiment, all attribute comparison matching scores are combined to yield the aggregate matching score. In an embodiment, the highest single comparison scores for each attribute are combined—regardless of the number of comparisons for the attribute—to determine the aggregate matching score for the pair of records.

In an embodiment, the aggregate matching score for the record pair is passed to another random forest, logistics regression, or similar machine learning model. Training this model with labeled matched and unmatched record pairs yields a ML model adapted to identify matched or unmatched pairs according to the final statistically weighted and frequency adjusted attribute feature vector distance scores.

Entity resolution provides for the matching and linking of records from multiple sources. Data can be standardized, categorized, bucketed (indexed), and compared in order for matching and linking to occur. After standardization, additional metadata attributes can be generated for individual records, expanding the scope of the records which can be used for comparisons. Metadata attributes can be mapped to the record in terms of phonetically similar strings, strings having two or more transposed characters in relation to the original string, similar address strings, similar names, and nicknames to expand the scope of the record to be used in selecting candidates for matching and linking to other records. As an example, a record for "Robert" can have nickname metadata: "Bob", and "Bobby" mapped to the record for use in matching and linking to other records having sufficient other record fields which match. Metadata attributes can be included as indexing and/or matching attributes.

Figure 3A:
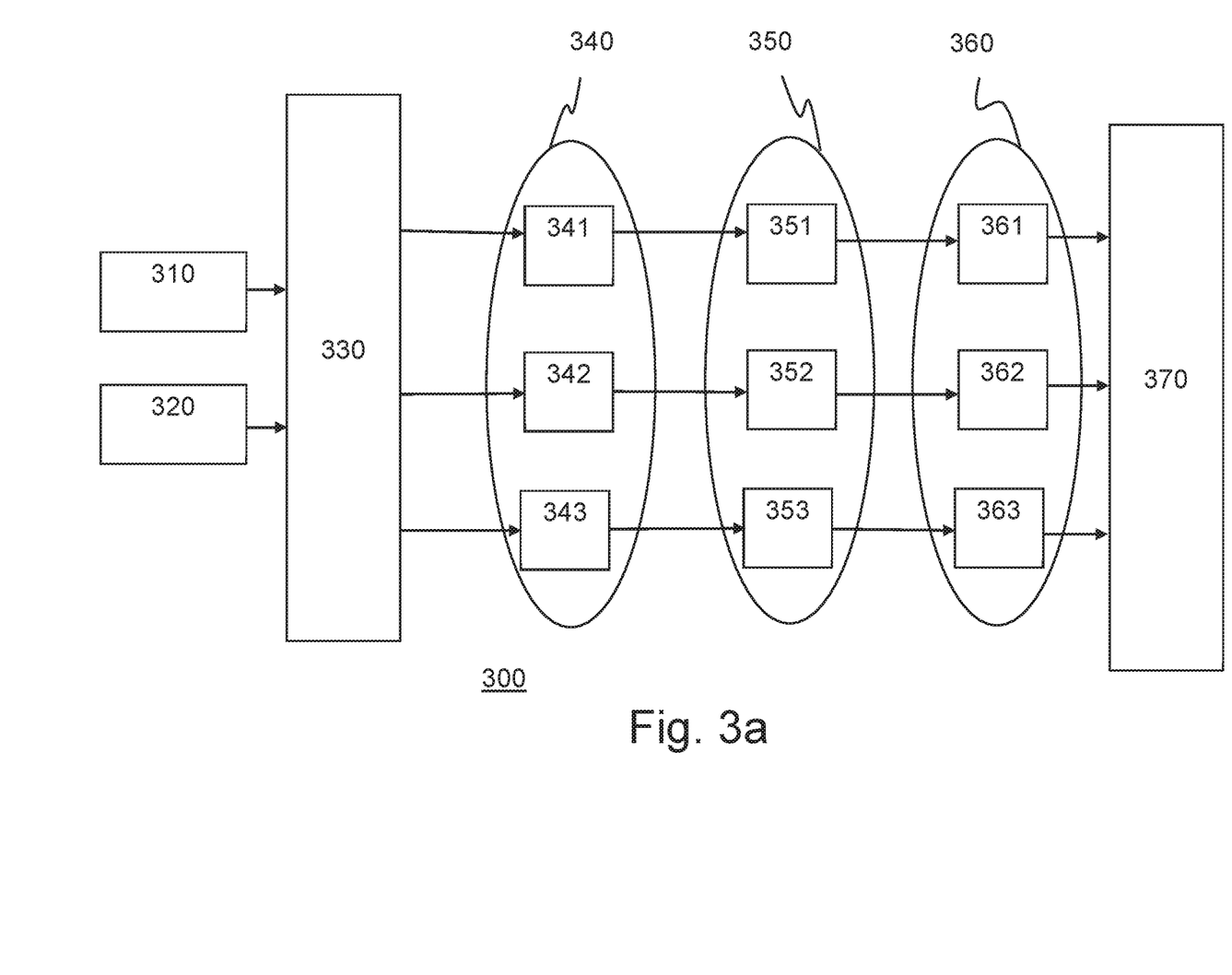
FIGS. 3a and 3b provide flowcharts depicting an additional operational sequence, according to at least one embodiment of the invention.
Figure 3B:
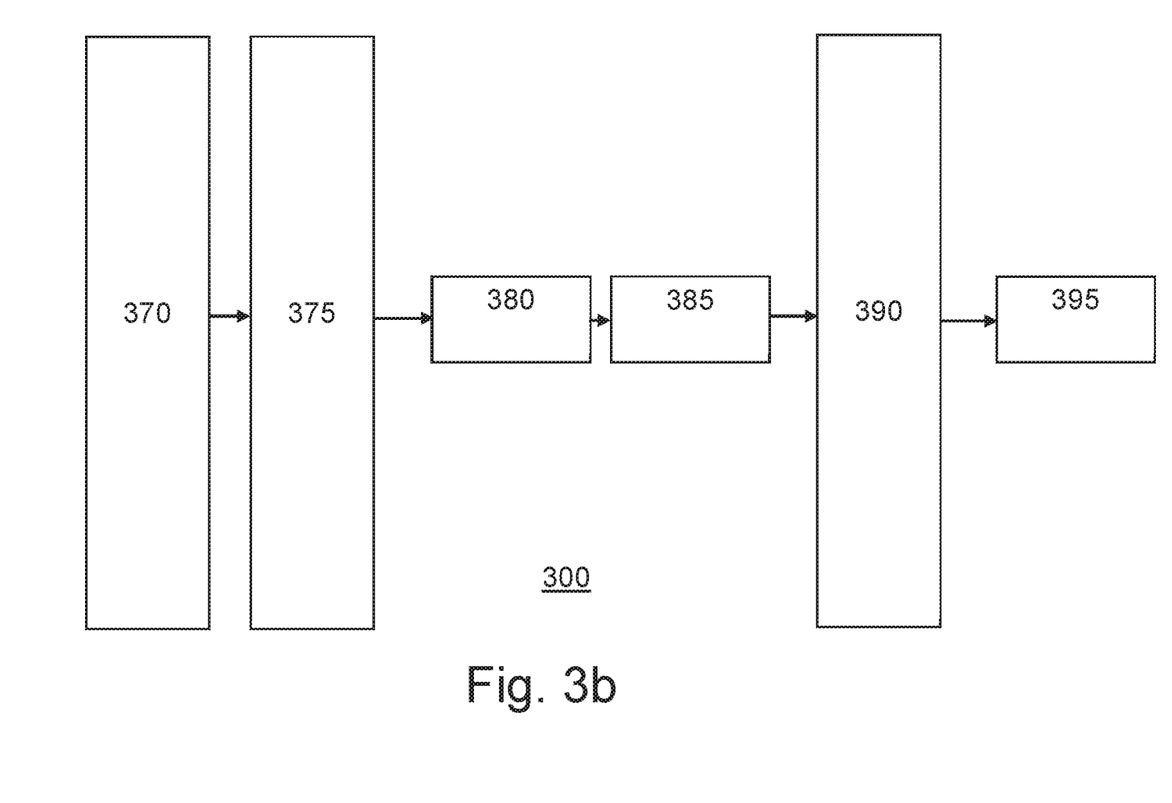

Flowchart 300 of FIGS. 3a-3b, illustrates an overlay of the disclosed invention with a typical workflow. In an embodiment, the values 310, 320 of the defined set of indexing attributes for two incoming records are cleaned and standardized as described above, including expanding the attributes with metadata to accommodate misspelling and transposed digits. Attribute values for pairs of records are then matched using a probabilistic matching engine 330. The PME 330 returns sets of attribute comparisons 340 (341, 342, 343) for the pair of records. As an example, a first record includes a Name1, a Name2 (nickname), and date of birth (DOB) for a subject. A second record includes a Name3, and a DOB for a subject. The PME 330 returns matching feature vectors for each of the Name1:Name3, Name2:Name3, and DOB comparisons.

In an embodiment, defining unique feature vectors for each attribute provides a mechanism to accommodate attribute differences. Attribute feature vectors represent the comparison details of the respective attributes. As an example, comparison details for a name attribute include: exact match, nickname match, phonetic match, token (character) edit distance match, etc. Feature vectors include a defined dimension for each attribute comparison detail. Comparison details across a set of data entry attributes vary as do the details and possibly, the number of feature vector dimensions.

In an embodiment, the values of the matching attributes of the incoming and existing records are compared. Feature vector values are determined by the PME for each comparison detail of the attribute and associated feature vector.

As an example, in some MDM systems, the attributes: Name, Identifier, DOB, Email, Phone and Address, play key roles in matching data entries. Comparison details and feature vector dimensions vary by attribute.

In an embodiment, Name attribute comparison details include: exact match, nicknames, phonetic equivalents, edit distance match, generation values etc. for the tokens in two names being compared. In an embodiment, feature vector $V_{name}$ includes the dimensions [#exact matches, #tokens having edit distance<=3, #nickname matches, #disagreement tokens (edit distance>3), #initials match, #phonetic matches, #left-out tokens, generation code]. In an embodiment, the generation code includes an integer value of 1 or −1 indicative of the respective presence or absence of a match between the two compared values.

In an embodiment, the Identifier attribute comparison primarily evaluates exact match and edit distance details of the two compared records. The attribute records include social security number, passport number, and similar identifying data. In this embodiment, feature vector $V_{id}$ incudes the dimensions [bool(exact match), bool(edit distance match (edit dist<=2), bool(unmatched)].

In an embodiment, the DOB comparison details include exact match, year-only match, year & month together match, year matches but month & day are transposed etc. In this embodiment, for Date D1, D2, the feature vector is formulated as: $V_{Date}$=[bool(fullDateMatch), bool(onlyYearMatch), bool(YearMonthMatch), bool(MonthDayMatch), bool(isDayMonthTransposed)].

In an embodiment, comparison details for the email attribute include exact match, partial match (edit distance comparison), and unmatched. In this embodiment, for emails E1 and E2, the feature vector is formulated as: $V_{Email}$=[bool(exact match), bool(edit distance match (edit dist<=3), bool(unmatched (edit dist>3)].

In an embodiment, the address and phone attributes share a single comparison. Address consists of street num., city, state, country and zip code. If zip code is not present, city and street are compared otherwise only street num & zip code are compared. Zip code requires exact match and edit distance match while other tokens require exact match, phonetic match, nickname match and edit distance match. For phone numbers, exact match and edit distance match are checked. For Address & Phone (A1,P1) and (A2,P2), feature vector can be formulated as: $V_{AXP}$=[bool(isZipPresent), bool(StreetExact), bool(StreetPartial), bool(StreetMismatch), bool(ZipExact), bool(ZipEditDist), bool(ZipMismatch), bool(CityExact), bool(CityPartial), bool(CityMismatch), bool(StateExact), bool(StatePartial), bool(StateMismatch), bool(CountryExact), bool(CountryPartial), bool(CountryMismatch), bool(PhoneExact), bool(PhoneEditDist), bool(PhoneMismatch)].

The PME passes comparison feature vectors (341, 342, 343) for each pair of compared entries, to trained machine learning models 350 (351, 352, 353). The models 350 determine distances 360 (361, 362, 363) between the pair of entries according to each feature vector. The models 350 include a random forest, logistic regression, or similar machine learning structure. The models 350 are trained using a data set of randomly-generated, labeled matched and unmatched data entries, to prevent overfitting the model weights. A data generator (not shown) creates matched pairs of entries having varying degrees of matched and unmatched comparison features, as well as pairs of completely unmatched pairs of data. For example, name pairs including matched, Amanda Smith: Amanda Smith, partially matched: Chris Jackson: C. Jackson, and unmatched, Olen Brown: Brandon Wilson, are provided to the model. The trained model provides a probability of a match between the data records.

In an embodiment, the machine learning models 350 map a probability output to a distance 360, associated with the feature vector of the comparison. In this embodiment, probability to distance mapping functions include a simple function linearly mapping probability to distance in increments mapping 0-100% probability to 0-10 distance. 0 maps to 0, 0.0%-10% maps to 1, and so on. In an embodiment, evaluation of the distribution of probabilities for the training data set reveals clusters of data points used to define a mapping function for use with new data. Machine learning distances 360 are output to a module for weighting 370 and attribute frequency 375 (FIG. 3b) adjustments.

In an embodiment, weighting module 370 includes a statistical weight for each possible distance 360 output of the ML distance module 350. The weights are determined using statistical processes to evaluate the significance of each feature vector-distance combination among the set of feature vector-distance possibilities, and to assign an appropriate weighting value to each possible weighting vector.

In an embodiment, attributes are evaluated according to a statistical profile relating to the relative significance of different attribute value comparison outcomes (matched or unmatched) across the population of records. In an embodiment, determination of an outcome's statistical weight includes evaluating the log-ratio of the probabilities of that outcome in matched and unmatched comparison sets. The evaluation can consider all attributes.

The ML module distance scores are further adjusted according to the attribute frequency by frequency module 375. For each evaluated attribute, the frequency of occurrence of the attribute among all the attributes is determined. Frequency of occurrence is defined as the total number of times the attribute is present in the set of candidates divided by the total number of candidates considered. (As an example, 990 candidate records out of 1000 candidates considered had a phone number attribute for a frequency of occurrence of 990/1000, or 0.99.).

In an embodiment, the frequencies of occurrence of the two compared values are evaluated to determine which frequency of occurrence is larger. The method adjusts the ML distance score for each attribute using the larger frequency of occurrence and the weight associated with the ML module distance score for each attribute. The method adjusts the ML distance score according to the formula:

$$\text{Corrected score}(i) = \text{score}(i) * [1 + (\log[pu(0)] - \log(f))/\text{score}(0)]$$

where corrected score(i) is the adjusted score for the ith attribute, score(i) is the original score for the ith attribute, pu(0) is the probability of an ML distance score of 0 for the ith attribute in an unmatched set, f is the larger of the two compared frequencies of occurrence, and score 0 is the statistical weight assigned to an ML distance score of 0 for the attribute.

The output from the weighting 370 and frequency 375 adjustment modules includes a set of adjusted matching scores 380, one score for each attribute compared. In an embodiment, the total set of scores is added together to yield an aggregate comparison score 385 for the comparison. As an example, in computing the total score for an output including two name comparisons and a single DOB comparison, all three scores are added together. In an embodiment, only the highest scores for each attribute are summed to calculate the aggregate comparison score 385 for the pair. In this embodiment, the aggregate comparison score 385 for the output including two name and one DOB comparisons includes only the highest of the two name scores added to the DOB score.

In an embodiment, another ML model 390 is trained using the aggregate comparison score 385 of the weighting 370 and frequency 375 modules for the training data set. In this embodiment, the ML model 390 is provided the aggregate comparison scores 385 of the statistical weight 370 and frequency 375 adjusted output for labeled data pairs, including the matched and unmatched pairs, and trained to differentiate between matched and unmatched pairs according to the final weighted and frequency adjusted aggregate scores. The output of ML model 390 includes a probability score that a pair matches based upon the inputs including the aggregated comparison score for the pair. In an embodiment, a random forest, logistic regression or similar machine learning models are used for ML model 390.

In an embodiment, master data program 175 includes a false-positive module. In this embodiment, the false positive module tracks feature vector values and patterns associated with false positive matches. Falsely matched data records may be provided as part of the training data set and may be labeled as false positives. In this embodiment, records manually identified as falsely matched are passed to the false positives module to update the false positive feature vectors set and to provide data for identifying patterns in the false positive feature vectors. In an embodiment, matching records are reviewed by the false positives module relative to the current state of the false positives feature vector set and the recognized patterns for false positive feature vector matches.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
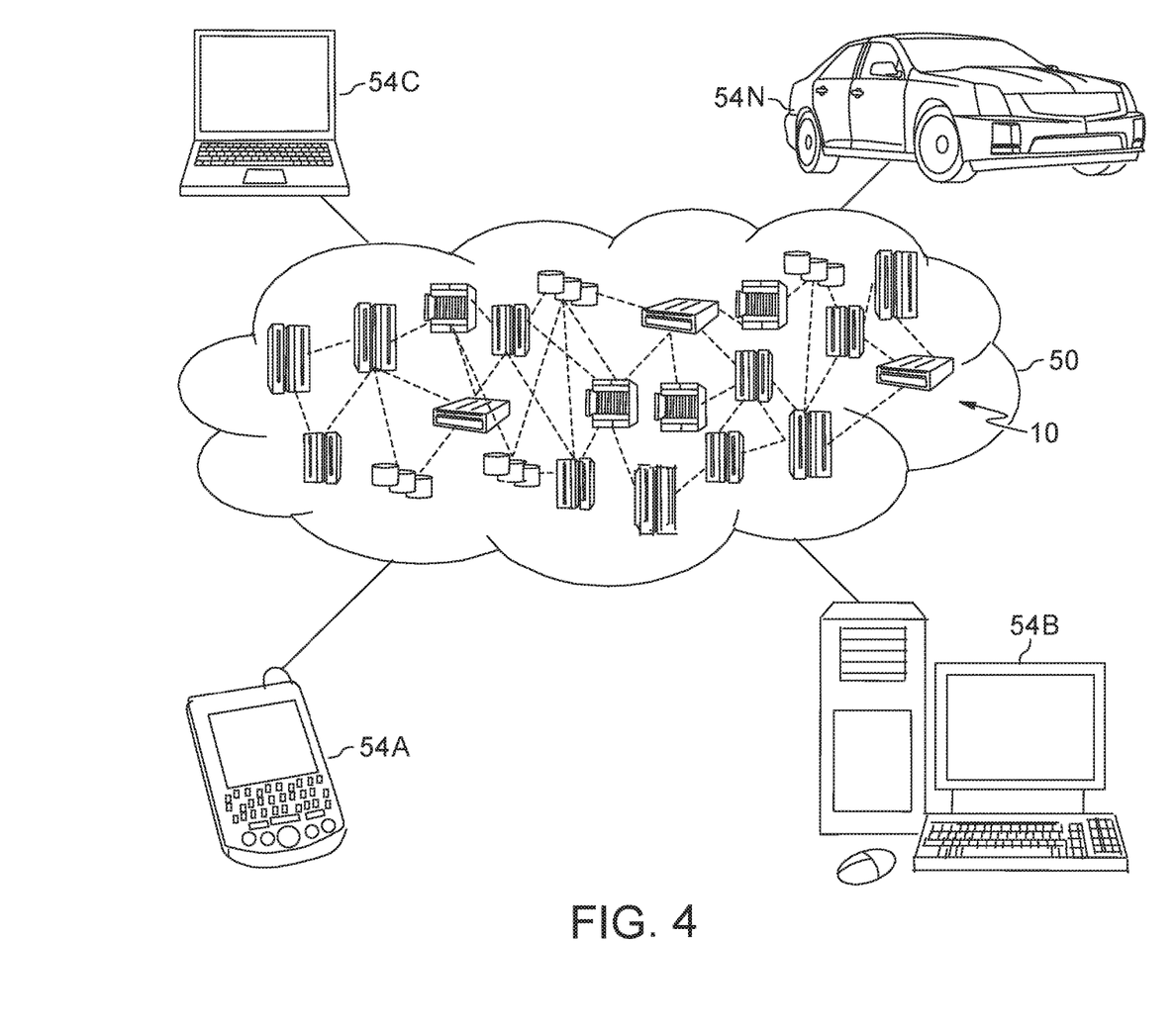
FIG. 4 depicts a cloud computing environment, according to at least one embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
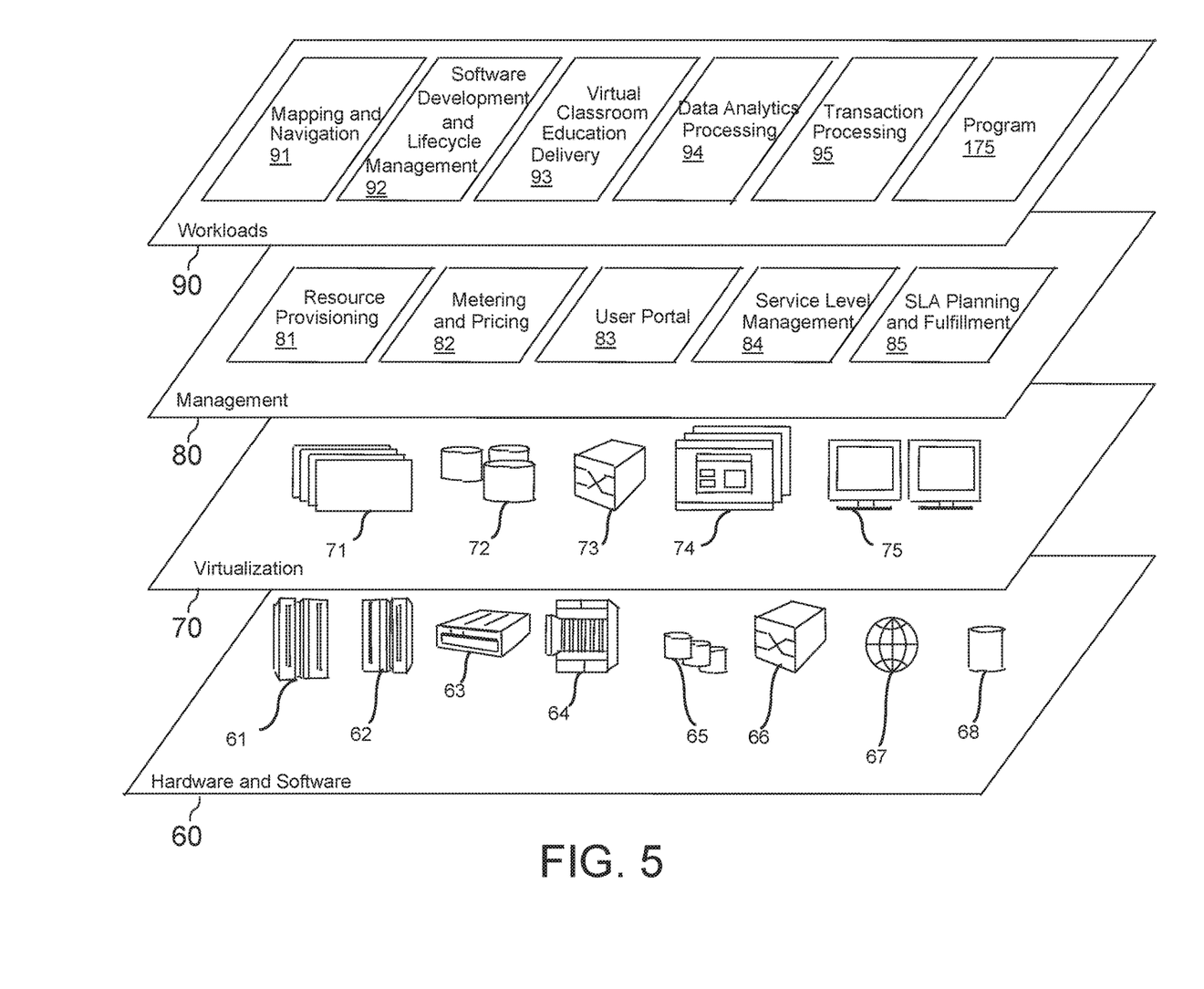
FIG. 5 depicts abstraction model layers, according to at least one embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for matching records in an entity resolution system, the method comprising:
   defining, by one or more computer processors, entity attribute feature vectors;
   determining, by the one or more computer processors, an entity attribute matching score according to a distance between two of the entity attribute feature vectors;
   assigning, by the one or more computer processors, a statistical weight to the entity attribute matching score;
   adjusting, by the one or more computer processors, the entity attribute matching score according to the statistical weight and an entity attribute frequency of occurrence; and
   determining, by the one or more computer processors, an aggregate entity attribute matching score based, at least in part, on the entity attribute matching score and at least one additional entity attribute matching score.

2. The computer implemented method according to claim 1, wherein determining an entity attribute matching score according to a distance between two entity attribute feature vectors comprises determining a probability of matching according to the two entity attribute feature vectors.

3. The computer implemented method according to claim 1, wherein determining an entity attribute matching score according to a distance between two entity attribute feature vectors comprises mapping a probability of matching according to the two entity attribute feature vectors to a distance.

4. The computer implemented method according to claim 1, wherein assigning a statistical weight to an entity feature matching score comprises assigning a weight defined according to a machine learning model.

5. The computer implemented method according to claim 1, wherein assigning a statistical weight to an entity feature matching score comprises assigning a weight according to a distance between two entity attribute feature vectors.

6. The computer implemented method according to claim 1, wherein adjusting the entity attribute matching score according to the entity attribute frequency of occurrence comprises determining a frequency of occurrence for each of two compared attribute values and adjusting the entity attribute matching score according to a larger frequency of occurrence of the two compared attribute values.

7. The computer implemented method according to claim 1, further comprising evaluating matched entity pairs using a false positive feature pattern.

8. A computer program product for matching records in an entity resolution system, the computer program product comprising one or more computer readable storage devices and stored program instructions on the one or more computer readable storage devices, the stored program instructions comprising:
   program instructions to define, by one or more computer processors, entity attribute feature vectors;
   program instructions to determine an entity attribute matching score according to a distance between two entity attribute feature vectors;
   program instructions to assign a statistical weight to an entity attribute matching score;
   program instructions to adjust the entity attribute matching score according to the statistical weight and an entity attribute frequency of occurrence; and
   program instructions to determine an aggregate entity attribute matching score.

9. The computer program product according to claim 8, wherein determining an entity attribute matching score according to a distance between two entity attribute feature vectors comprises determining a probability of matching according to the two entity attribute feature vectors.

10. The computer program product according to claim 8, wherein determining an entity attribute matching score according to a distance between two entity attribute feature vectors comprises mapping a probability of matching according to the two entity attribute feature vectors to a distance.

11. The computer program product according to claim 8, wherein assigning a statistical weight to an entity feature matching score comprises assigning a weight defined according to a machine learning model.

12. The computer program product according to claim 8, wherein assigning a statistical weight to an entity feature matching score comprises assigning a weight according to a distance between two entity attribute feature vectors.

13. The computer program product according to claim 8, wherein adjusting the entity attribute matching score according to the entity attribute frequency of occurrence comprises determining a frequency of occurrence for each of two compared attribute values and adjusting the entity attribute matching score according to a larger frequency of occurrence of the two compared attribute values.

14. The computer program product according to claim 8, the stored program instructions further comprising program instructions to evaluate matched entity pairs using a false positive feature pattern.

15. A computer system for matching records in an entity resolution system, the computer system comprising:
- one or more computer processors;
- one or more computer readable storage devices; and
- stored program instructions on the one or more computer readable storage devices for execution by the one or more computer processors, the stored program instructions comprising:
  - program instructions to define, by one or more computer processors, entity attribute feature vectors;
  - program instructions to determine an entity attribute matching score according to a distance between two entity attribute feature vectors;
  - program instructions to assign a statistical weight to an entity feature matching score;
  - program instructions to adjust the entity attribute matching score according to the statistical weight and an entity attribute frequency of occurrence; and
  - program instructions to determine an aggregate entity attribute matching score.

16. The computer system according to claim 15, wherein determining an entity attribute matching score according to a distance between two entity attribute feature vectors comprises determining a probability of matching according to the two entity attribute feature vectors.

17. The computer system according to claim 15, wherein determining an entity attribute matching score according to a distance between two entity attribute feature vectors comprises mapping a probability of matching according to the two entity attribute feature vectors to a distance.

18. The computer system according to claim 15, wherein assigning a statistical weight to an entity feature matching score comprises assigning a weight defined according to a machine learning model.

19. The computer system according to claim 15, wherein assigning a statistical weight to an entity feature matching score comprises assigning a weight according to a distance between two entity attribute feature vectors.

20. The computer system according to claim 15, wherein adjusting the entity attribute matching score according to the entity attribute frequency of occurrence comprises determining a frequency of occurrence for each of two compared attribute values and adjusting the entity attribute matching score according to a larger frequency of occurrence of the two compared attribute values.

* * * * *